US008311231B2

(12) United States Patent
Monks et al.

(10) Patent No.: US 8,311,231 B2
(45) **Date of Patent: *Nov. 13, 2012**

(54) AUTOMATED SOUND SYSTEM DESIGNING

(76) Inventors: Michael C. Monks, Acton, MA (US); Didier Burton, Ashland, MA (US); Christine M. Hostage, Southborough, MA (US); Robert P. Kosman, Lunenburg, MA (US); Anthony J. Silva, Tyngsboro, MA (US)

( * ) Notice: Subject to any disclaimer, the term of this patent is extended or adjusted under 35 U.S.C. 154(b) by 1646 days.

This patent is subject to a terminal disclaimer.

(21) Appl. No.: 11/684,903

(22) Filed: Mar. 12, 2007

(65) Prior Publication Data

US 2007/0150284 A1 Jun. 28, 2007

Related U.S. Application Data

(63) Continuation of application No. 10/126,016, filed on Apr. 19, 2002, now Pat. No. 7,206,415.

(51) Int. Cl.
*H04R 29/00* (2006.01)
*G06F 17/00* (2006.01)

(52) U.S. Cl. ........................................ 381/58; 700/94

(58) Field of Classification Search .................... 381/58, 381/59, 61, 103; 700/94; 715/727; 84/601, 84/604, 609; 704/272

See application file for complete search history.

(56) References Cited

U.S. PATENT DOCUMENTS 5,812,674 A 9/1998 Jean-Pascal et al.
5,872,852 A 2/1999 Dougherty
7,206,415 B2 * 4/2007 Monks et al. .................. 381/58
7,643,640 B2 * 1/2010 Jorgensen et al. ............. 381/61
8,027,483 B2 * 9/2011 Jorgensen et al. ............. 381/61

FOREIGN PATENT DOCUMENTS

EP 0 593 228 4/1994
JP 07-28481 1/1995
JP 11-327568 11/1999

OTHER PUBLICATIONS

Office Action in Application No. JP2003-115279, dated Jul. 8, 2008.
IN First Examination Report dated Jul. 14, 2011 pertaining to IN Application No. 327/DEL/2003.
Communication in corresponding European application No. 03 100 785.9-2225, dated Dec. 2, 2009.
Office Action dated May 9, 2008 from China Application No. 03122980.8.

* cited by examiner

*Primary Examiner* — Xu Mei

(57) ABSTRACT

An automated sound system design device and a method for operating it. A computer is constructed and arranged to accept input of facility information signals and sound system preference signals requirements, and using a previously stored assemblage of component performance capability data signals to generate a sound system output signal configuration, representative of a desired sound system.

11 Claims, 9 Drawing Sheets

AUTOMATED SOUND SYSTEM DESIGNING

This application is a continuation and claims the benefit of priority under 35 USC 120 of U.S. application Ser. No. 10/126,016, entitled AUTOMATED SOUND SYSTEM DESIGNING, filed Apr. 19, 2002 now U.S. Pat. No. 7,206,415. The disclosure of the prior application is considered part of and is incorporated by reference in the disclosure to this application.

Then invention relates to the design of sound systems for commercial establishments, and more particularly to an automated method for designing sound systems.

BACKGROUND OF THE INVENTION

It is an important object of the invention to provide an improved method for designing sound systems.

BRIEF SUMMARY OF THE INVENTION

According to the invention, a method for designing a sound system for a facility includes inputting performance data signals representing desired performance properties for the sound system to a computer processor: inputting acoustic data signals representing acoustic characteristics of acoustic spaces in the facility to the computer processor; comparing, by the processor, the acoustic data signals and the performance data signals with a preexisting data base of sound equipment component capability signals; and generating, by the processor in real time, output configuration signals for the sound system, the sound system including loudspeakers and amplifiers.

In another aspect of the invention, an apparatus for designing a sound system for a facility includes a memory, for storing data signals representing sound system component properties; and a computer processor, coupled to the memory, constructed and arranged to accept as input data information signals including desired sound system performance capability signals. The input data signals also include acoustic signals characteristics of the facility. The computer processor is constructed and arranged to generate in real time, based on the acoustic characteristic signals and the desired sound system performance capability signals sound system configuration output signals representative of components and interconnections between the components.

Other features, objects, and advantages will become apparent from the following detailed description, when read in connection with the accompanying drawing in which:

DETAILED DESCRIPTION

Figure 1:
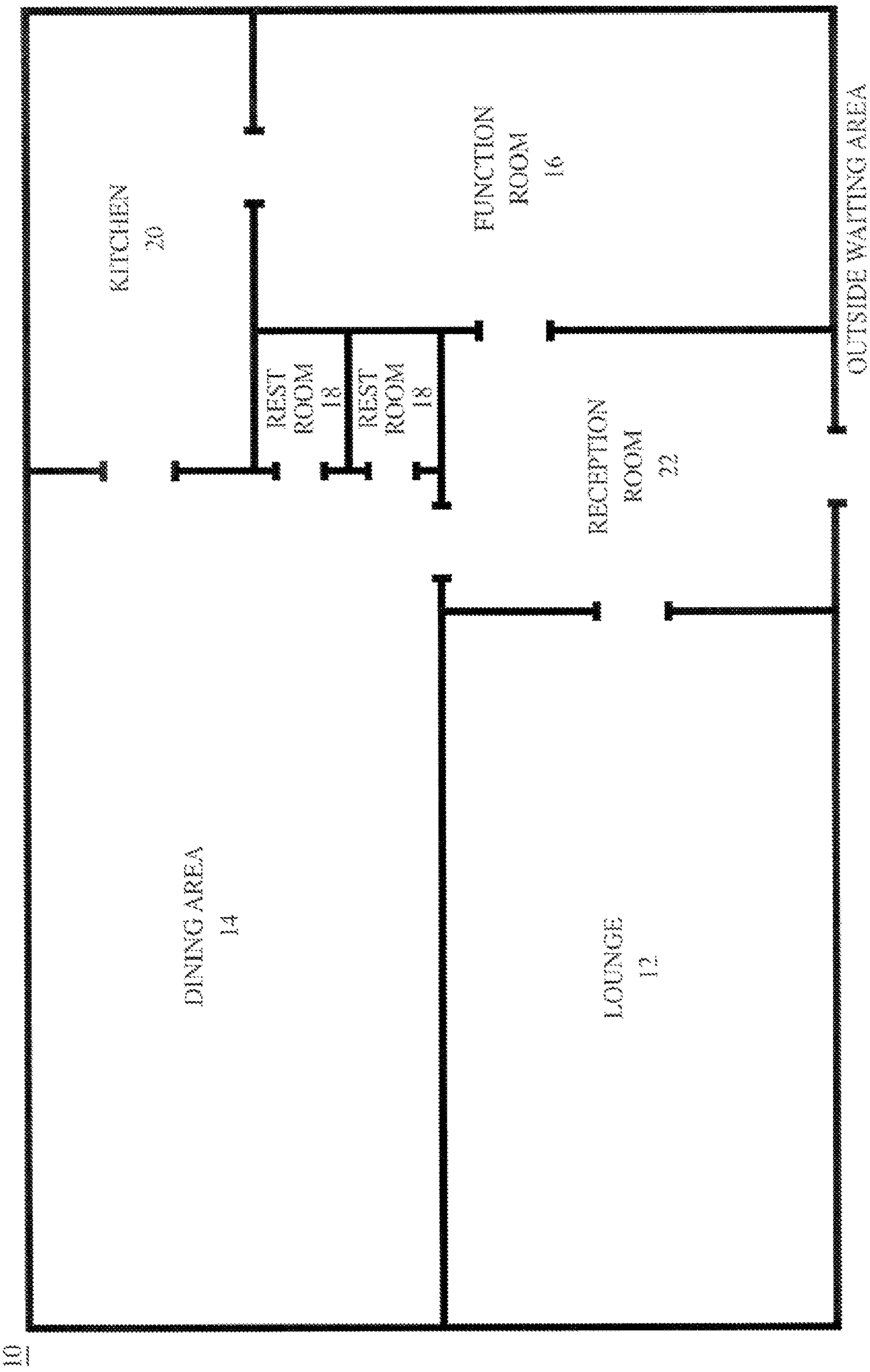
FIG. 1 is a floor layout useful in explaining aspects of the invention.

With reference now to the drawing and more particularly to FIG. 1, to illustrate the purpose of the invention, there is shown a simplified floor plan of an exemplary restaurant. Restaurant 10 includes a number of separate areas, each having different needs for the sound system, such as in terms of sound source, music genre, and loudness desired. For example, lounge area 12 may be equipped with a large screen television and several monitors, and may need to accept as input sound from a DVD and CD player, or cable or satellite TV broadcast. The sound may be used as background music or for the audio portion of a television broadcast. The volume is preferably automatically adjustable by the sound system so that it is not too loud when the lounge is relatively quiet, but is audible when the ambient noise is high, when, for example a large crowd is watching the broadcast of a sporting event. The sound in dining area 14 may be primarily for background music, with the source a CD changer. The volume in the dining area is preferably automatically adjustable, but the maximum volume may not need to be as high as in the lounge area, because the maximum ambient noise may be less. Function room 16 may be a versatile area, so that it can be used as an auxillary dining area having the same sound needs as dining area 14. Additionally, function room 16 may be able to accommodate meetings requiring foreground speech audibility, and for entertainment, so that the music is foreground as well as background and automatically adjustable volume, with a higher maximum volume than in dining area 14. Function room 16 may also be equipped for large screen television broadcasts, as in lounge area 12. Restrooms 18 may only furnish background music from the same source as for dining area 14, but may not be automatically adjustable volume nor as high a maximum volume as in dining room 14. All areas of the restaurant, including kitchen 20 may be constructed and arranged to broadcast audible alarms from an automated alarm source and pages at an appropriate level. It may be desirable for a host or hostess in reception area 22 to be able to broadcast a page to patrons in the lounge area 12 (for example patrons awaiting a table in the dining area) or to an outdoor waiting area 24 without broadcasting the page to the dining area 14.

There follows definition of a number of terms. A facility includes an entire building, or major portion of a building, to be serviced by the sound system. In the above example, restaurant 10 is a facility. An acoustic space is a contiguous portion of a facility that has common acoustic properties (for example reverberation characteristics). Acoustic properties are typically the result of room geometry (including ceiling height), floor treatment, wall treatment, windows and window treatment, and the like. In the example above, the dining room 14, the function room 16, and the combined lounge 12 and reception area 22 may each be acoustic spaces. A listing area is a portion of the facility that has a common set of sound system requirements, such as maximum and minimum sound pressure level, frequency response, similar importance of speech band and music band. An acoustic space and a listening area may be coincident as they are in this example. In other situations, a single acoustic space may contain multiple listening areas. For example, if there were no wall between the lounge and reception area 22, the lounge and reception area could be a single acoustic space with two different listening areas. A zone is a portion of the facility which may be noncontiguous, but which is serviced by a common amplifier channel. For example, the two restrooms 18 may be a zone, and the dining room, reception area, and function room may be acoustic spaces, listening areas, and zones.

Figure 2:
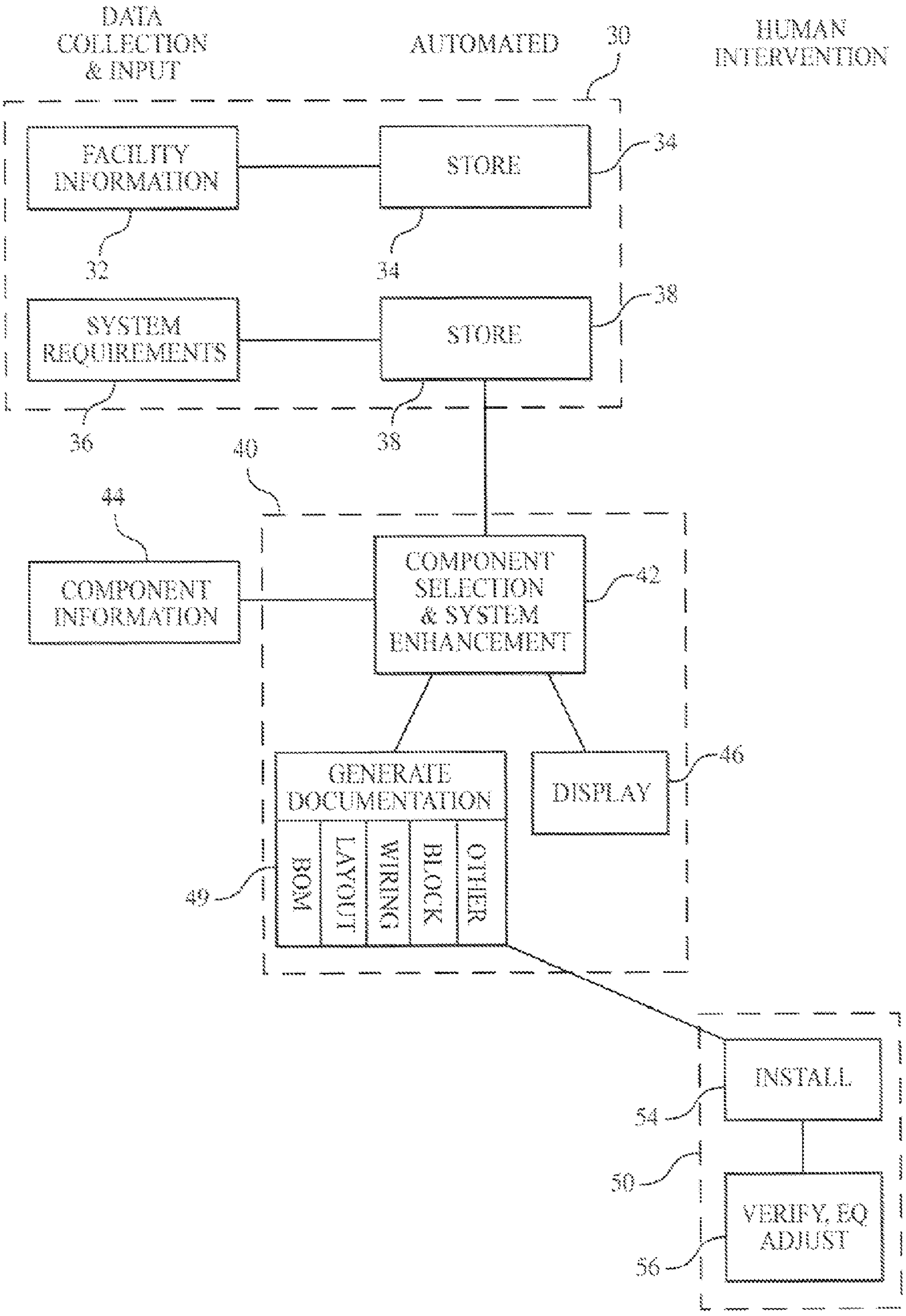
FIG. 2 is a block diagram of a process for designing a sound system for a facility such as in FIG. 1 and described in the accompanying section of the disclosure.

Referring now to FIG. 2, there is shown a block diagram of a process for designing, configuring, modifying, and maintaining a sound system for a facility such as shown in FIG. 1. Steps involving data collection and input are in the left column. Automated steps are in the center column. Steps that involve human intervention are in the right column. In data collection phase 30, information about the facility and the desired sound system characteristics is collected. In step 32, information about the facility is collected and representative signals input to a computer and stored at step 34. Facility information could include dimensions of the facility and the various listening areas, acoustic spaces, and zones. Facility information could also include the acoustic properties of the several acoustic spaces, and could also include information such as expected level of ambient noise. In step 36, desired performance properties are collected for each listening area and representative signals input to a computer and stored in step 38. Desired performance properties for a listening area could include desired maximum and minimum sound pressure level in dB SPL; relative importance of speech or music; aesthetic properties of the sound system; system cost; type of music to be played; system automation properties such as automatic on/off, and other items such as variations from standard components, existing equipment with which the system must operate, and nonstandard material or labor costs. Steps 32 and 36 and the specific activities included in steps 32 and 36 may be performed in any order.

Figure 3:
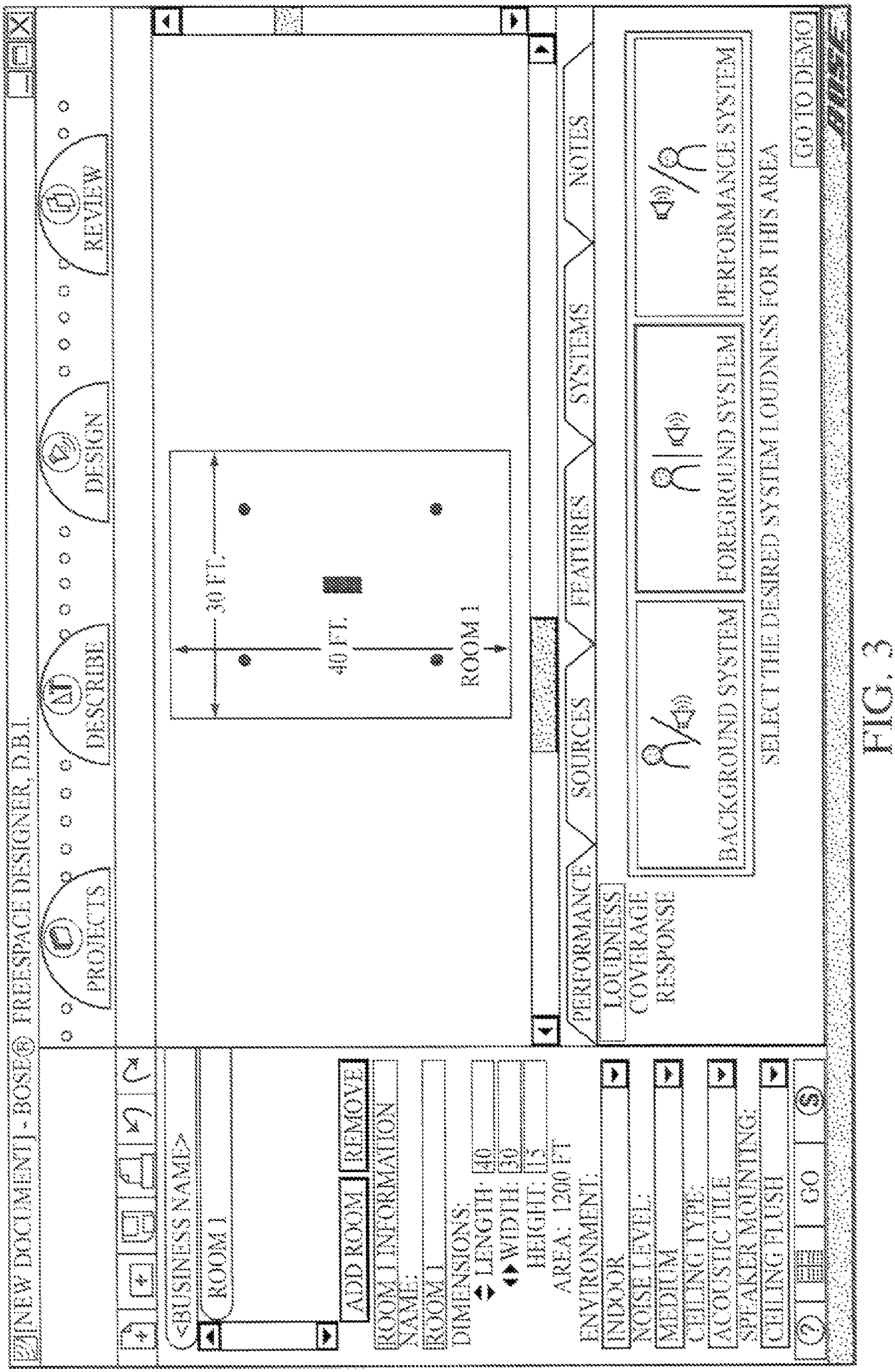
FIG. 3 is a depiction of a graphical user interface for inputting data and for displaying aspects of the invention.

The steps of the data collection phase 30 may be performed in a conventional manner. Data input signals may be facilitated by an appropriate graphical user interface as shown in FIG. 3. The data collected and signals input in steps 32, 34, 36, and 38 may be stored in a data base that is accessible by the computer (which will be discussed later) of system design phase 40.

The system design phase 40 includes a component selection and system enhancement step 42. In the component selection and system enhancement step, the information input signals in the data collection phase are compared with the signals representative of properties of various sound system components (such as amplifiers, loundspeakers, and electronics components) to select the components for an enhanced sound system. The signals representative of properties of sound system components may be stored in a database that has been previously assembled in step 44 and stored in a computer memory. Information about amplifiers could include number of channels; power distribution capacity (per channel and per amplifier); maximum gain; power requirements; and cost. Information about loudspeakers could include frequency response; coverage efficiency; power requirements; environmental limitations and capabilities; required fixturing; operation range; power rating; maximum rated SPL and cost. Information on the sound system components could also include ancillary features (such as mounting fixtures, wiring, and accessories). The sound system can be enhanced based on several factors, but in a commercial setting, is typically enhanced for cost and performance. The enhancement process will be explained in more detail below. In an optional display step 46, information about the sound system may be displayed. The information may be displayed in any form useful to the system designer or to others. The display step 46 is particularly useful in a commercial setting to receive customer approval. The steps of design phase 40 are repeated for each of the acoustic spaces in the facility.

Another phase in the system design phase is the document generation step 49, in which various documents are generated. The documents may include a bill of materials (BOM); a layout of the placement of speakers in the room; a wiring diagram; a block diagram showing the interconnections and logical arrangement of amplifiers, loudspeakers, and other components; and other documents that may be useful (such as documents for commercial purposes).

Figure 4A:
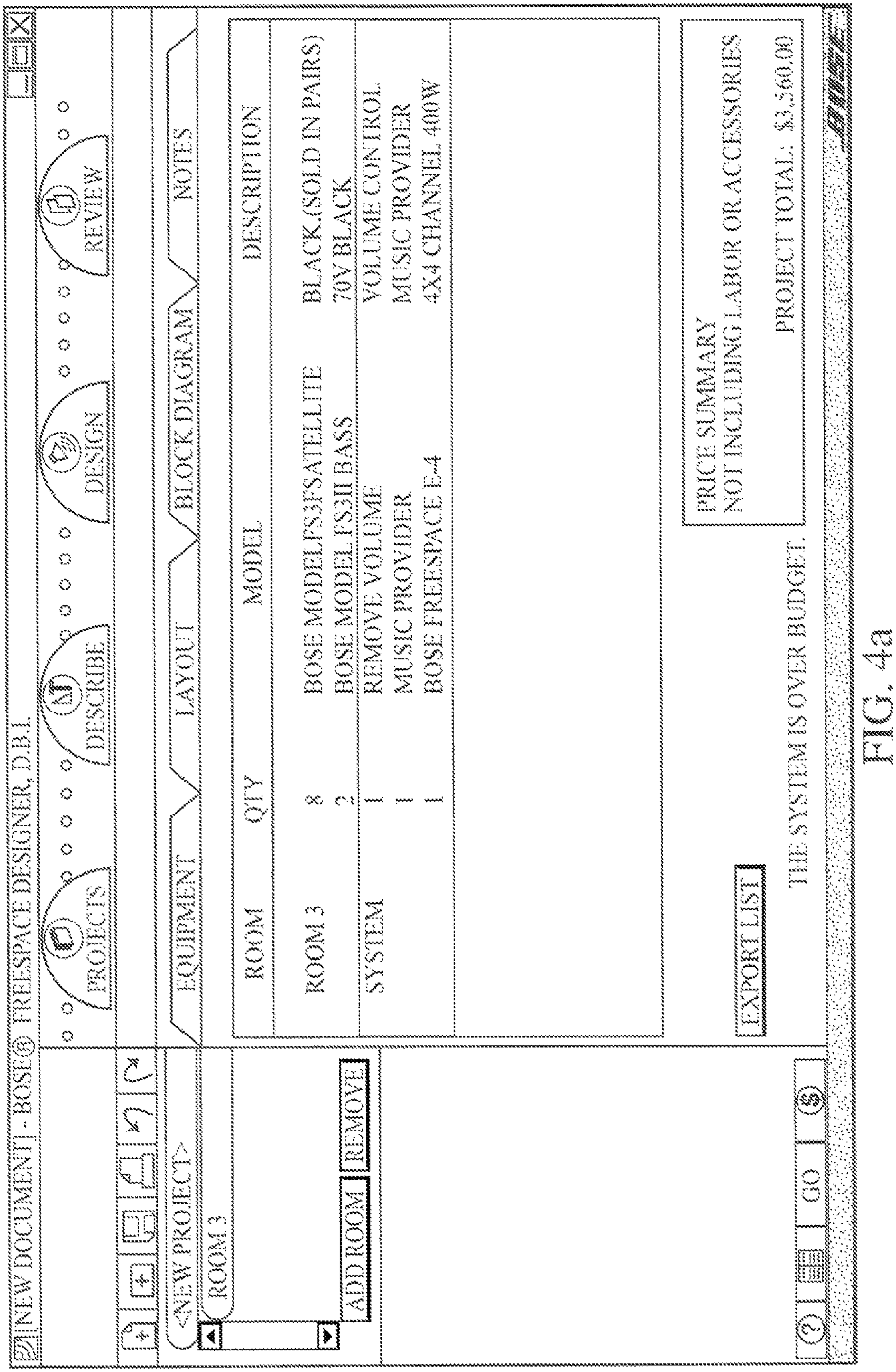
FIGS. 4*a* and 4*b* are depictions of a display on a computer monitor.
Figure 4B:
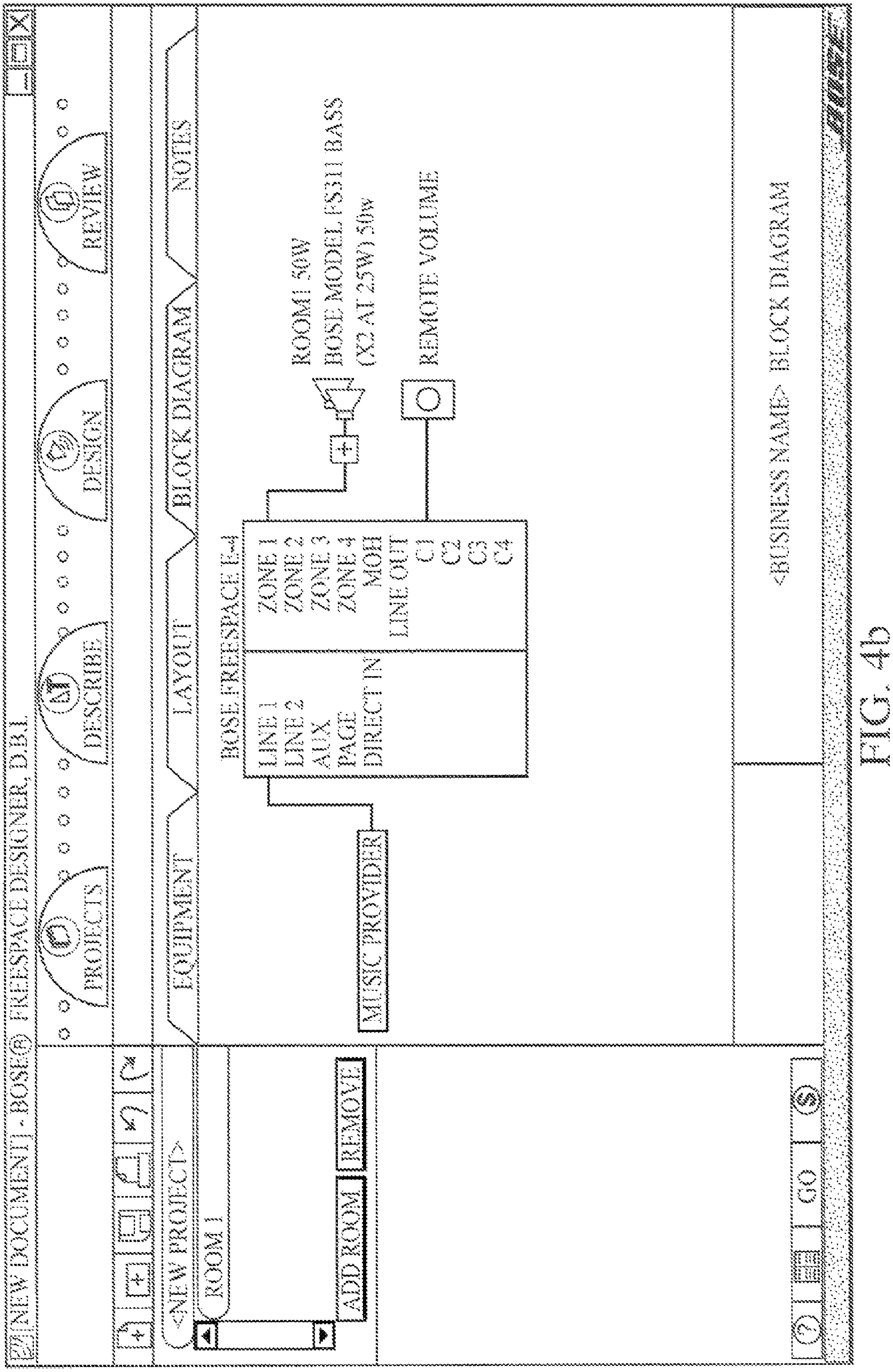

In the documentation generation step 49, information signals stored in the various databases is extracted and used to create the various documents. The BOM is assembled using information signals previously stored in the sound system component properties database combined with the specific components selected in system design phase 40. The layout and the wiring diagram are assembled using information collected at step 32 combined with the specific system components generated in the system design phase 40. The layout, wiring diagram, and BOM are generated in real time, that is when the data collection and input steps 32 and 36 are input, a layout and block diagram, and wiring diagram are generated immediately. A layout is displayed on the data input screen, as shown in FIG. 3. Examples of a BOM and of a block diagram and wiring diagram are shown in FIGS. 4*a* and 4*b*, respectively.

The real time generation of the layout, block diagram, and BOM is very advantageous, because it enables a sound system designer to immediately display an enhanced sound system to a customer, and if necessary, discuss performance/cost tradeoffs with the customer as soon as the customer's data is input.

The steps of system design phase 40 may be performed by a computer program that will be discussed in more detail below.

The system implementation phase 50 may include installation step 54, in which the components of the sound system (shown in the BOM) are acquired, and the components are physically installed according to the layout, the wiring diagram, and the block diagram. At step 56 the installed system is equalized, and adjusted.

Step 54 is performed in a conventional manner. A next step may be verification, equalization and adjustment at step 56. Verification is typically performed using acoustic measuring equipment to verify that the system performs as designed, for example radiates the sound pressure level and has the frequency response for which it was designed. Equalization may be done by many conventional means, or by automated means.

If the system designer changes the sound system, or if there is major maintenance on the sound system, the process of FIG. 2 may be performed again, so that the configuration generated and stored at step 42 always has an up-to-date configuration of the system.

In one implementation, the steps of data collection phase 30 and design phase 40 may be performed with the aid of computer program running on a personal computer. The personal computer may be a portable computer, so it can easily be taken to the site of the facility. Additionally, the same computer may be provided with a microphone and a frequency response measuring device and used for the equalization portion of step 56.

Figure 5A:
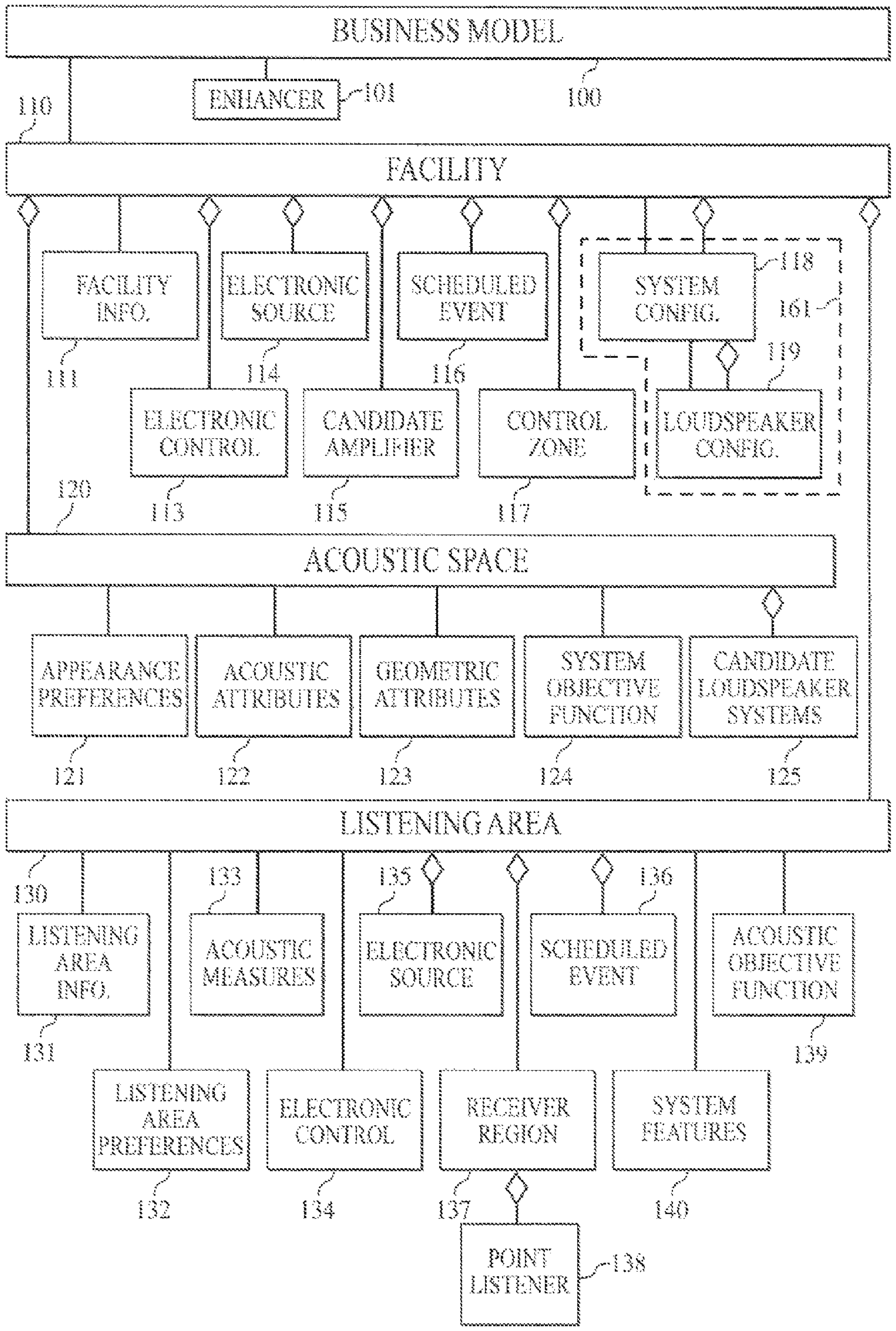
FIGS. 5*a* and 5*b* show a class of diagrams describing the architecture of a computer program according to the invention.
Figure 5B:
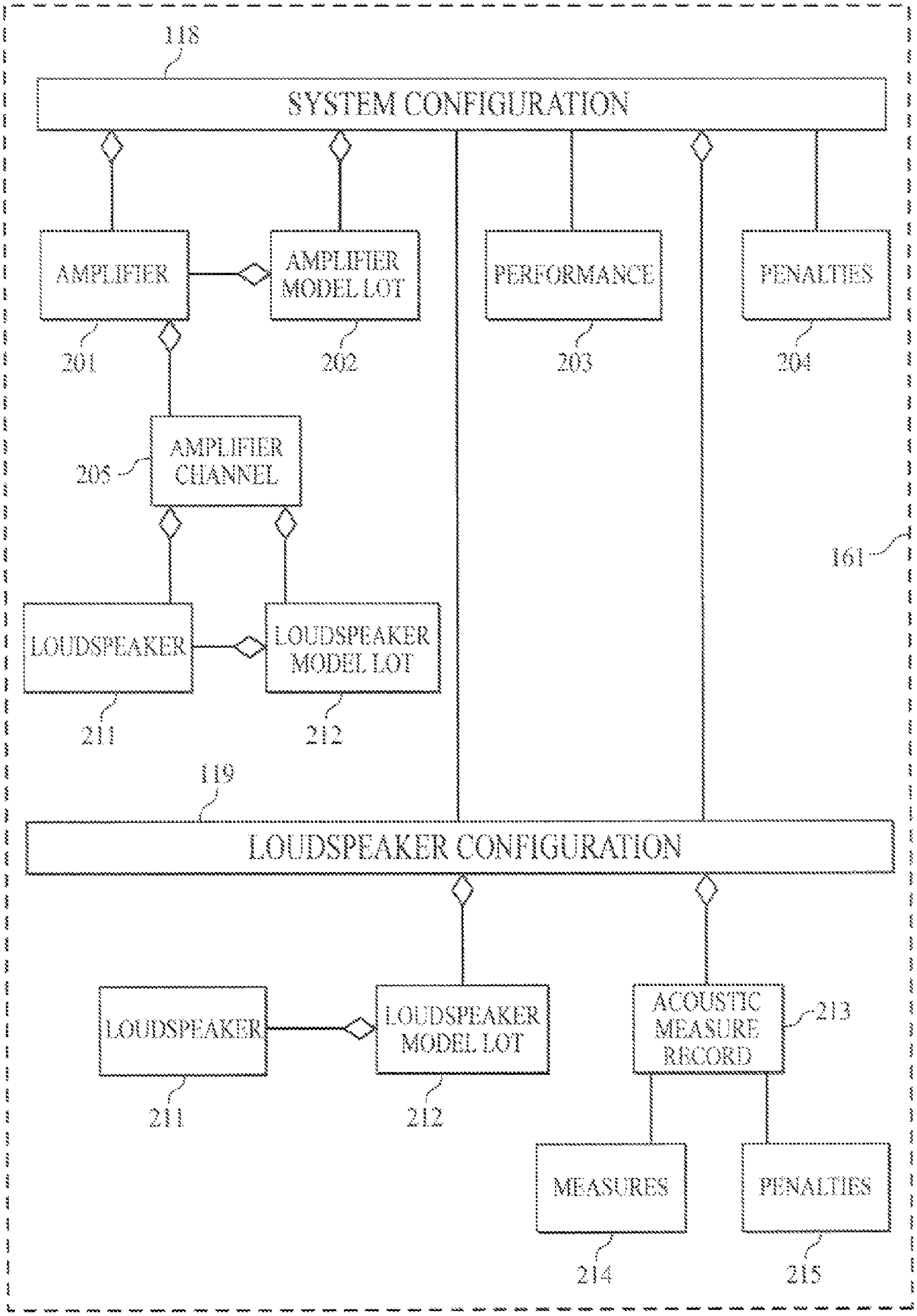

Referring to FIGS. 5*a* and 5*b*, there is shown a class diagram of a computer program for performing the steps in design phase 30 and configuration phase 40. The model, including syntax, notation, and conventions is consistent with Universal Modeling Language as described in Fowler, "UML Distilled" second edition, ISBN 78021 657838 and Gamma, et. al., "Design Patterns", ISBN 0201633612.

Class definitions and discussions follow. The class names are capitalized to distinguish them from nonclass elements having the same name. For example, "Acoustic Space" refers to a class; "acoustic space" refers to the physical entity defined above.

Business Model 100 is a façade (see "Design Patterns", p. 185) that interfaces with other programs. Business Model 100 may contain Optimizer 101. The classes contained by Business Model 100 fall into two spaces, a solutions space 161 and a requirements space which includes the remainder of the classes contained by Business Model 100. Classes in the requirements and resources space represent classes that define the desired properties of the sound system. Classes in solutions space 161 include classes that contain the loudspeaker systems and amplifiers that are available, and the configurations of loudspeakers and amplifiers that meet the properties defined in the properties space.

Enhancer 101 is a service module that assembles multiple sound system configurations and evaluates or optimizes them. Enhancer 101 is described in more detail in FIG. 7.

The physical representation of Facility 110 was defined above, in the discussion of FIG. 1. In the context of the program, it is contained by Acoustic Spaces 120 and Listening Areas 130 and may contain Facility Information 111 Facility Electronic Control 113, Facility Electronic Source 114, Candidate Amplifier 115, Scheduled Event 116, and Control Zone 117. A Facility may contain Facility Information 111.

Facility Classes:

Facility Information 111 refers to identifying information about the facility, such as address, owners name; the Facility Information class may also be used to record similar information that refers to other classes.

Facility Electronic Control 113 and Facility Electronic Source 114 each have two components, a desired properties component and a solution component. The Facility Electronic Control 113 and Facility Electronic Source 114 represent a summation of the Listening Area Electronic Control 134 and Listening Area Electronic Source 135 classes respectively, and will be discussed in more detail below.

Candidate Amplifier 115 holds a number of amplifier identification and specifications for use by enhancer 101 to configure sound systems. Candidate amplifiers may be arranged so that one amplifier is preferred above other amplifiers. For example, a user may wish to prefer a candidate amplifier for reasons other than how well its capabilities match the objectives. A particular amplifier, for example, may be more readily available or significantly less expensive.

Scheduled Event 116 is a master list of Scheduled Events 136 that are specified at the listening area level. Scheduled Event 136 is described below.

Control Zone 117 is a plurality of loudspeakers that could be serviced by a common amplifier. Loudspeakers may be serviced by the same amplifier if they are to receive a common acoustic signal, and if they operate on a common voltage and wattage. A control zone does not take into account the capacity of the amplifier.

System Configuration 118 is a collection of amplifiers and groups of loudspeakers. System configuration also contains Loudspeaker Configurations 119. System configuration will be discussed later in the discussion of FIG. 5*b*.

Loudspeaker Configuration 119 contains a grouping of loudspeakers. Loudspeaker configuration will be explained in more detail in the discussion of FIG. 5*b*.

The physical representation of Acoustic Space 120 was described above. In the context of the program, and Acoustic Space 120 contains Candidate Loudspeakers 125, Appearance Preferences 121, Acoustic Attributes 122, Geometric Attributes 123, and System Objective Function 124.

Acoustic Space Classes

Appearance Preferences 121 refers to appearance features of the loudspeakers, such as color, wall or ceiling mounted, and others.

Acoustic Attributes 122 contains the acoustic features that define the acoustic space.

Geometric Attributes 123 is a list of the geometric features, such as the shapes of the surfaces that constitute the acoustic space. The dimensions of acoustic spaces that were input in step 32 of FIG. 1 may be included in this class.

System Objective Function 124 is a function that places values on the objectives for the sound system for the acoustic space, and compares the objectives with the capability of the proposed sound system to determine how well the proposed sound system meets the objectives. The system objective function may allow weightings, so that, for example, in one situation coverage uniformity may be weighted more heavily than loudness.

Candidate Loudspeaker Systems 125 holds a number of loudspeaker system identifiers with specifications for use by Optimizer 101.

The physical representation of Listening Area 130 was defined above, in the discussion of FIG. 1. In the context of the program, Listening Area 130 is contained by Facility 110. In other embodiments, a Listening Area 130 may be contained by Acoustic Space 120, or Listening Area 130 may represent common physical entities. A Listening Area may contain Electronic Source 135, Scheduled Event 136, and Receiver Region 137, Listening Area Information 131, Listening Area Requirements 132, Acoustic Measures 133, Electronic Control 134, Acoustic Objective Function 139, and System Features 140.

Listening Area Classes

Listening Area Information 131 is descriptive information about the listening area.

Listening Area Preferences 132 is the sound system preferences for the listening areas. Examples are frequency range capability in the bass range, sound coverage uniformity (in standard deviations), loudness, and the like. Listening Area preferences may contain nonacoustic preferences, such as appearance. The system preferences that were input in step 36 may be included in this class.

Acoustic Measures 133 is the acoustic objectives for that listening area and the actual measurements for those factors. Examples are sound pressure level, bandwidth, and frequency response.

Electronic Control 134 and Electronic Source 135 each have each have two components, a preferences component and a solutions component. Listening areas may be a part of the customer preferences. For example, a customer may want a tuner and satellite television source in a listing area, and are therefore part of the preferences space. Providing a tuner and a satellite television source fulfills the preference, and is therefore in the solutions space. Similarly an electronic control element, such as a wall switch for turning the electronic components on and off may be both a preference and a solution.

Scheduled Event 136 is an event that automatically occurs at a specific time. Examples are system power on/off and volume setting change.

Receiver Region 137 contains the Point Listener 138 class.

Point Listener 138 is a point in a listening area that is used to determine system performance. Receiver Region 137 and Point Listener 138 are discussed in more detail in FIG. 6.

Acoustic Objective Function 139 is a function that places values on the objectives for the sound system for the acoustic space, and compares the objectives with the capability of the proposed sound system to determine how well the proposed sound system meets the objectives. The system objective function may allow weightings, so that, for example, in one situation coverage uniformity may be weighted more heavily than loudness.

System Features 140 are capabilities such as automatic volume control, remote control capability, and the like that are required for the listening area.

Referring to FIG. 5B, there is shown the classes of solutions space 161 in more detail, System Configuration 118 and Loudspeaker Configuration 119 in more detail. System Configuration 118 contains Amplifier 201, Amplifier Model Lot 202, and Loudspeaker Configuration 119, Performance 203 and Penalties 204. System Configuration 118 is the loudspeakers, loudspeaker settings, amplifier and amplifier settings in the sound system.

Amplifier 201 is contained by System Configuration 118 and Amplifier Model Lot 202 and contains Amplifier Channel 205. This class represents specific amplifiers to be used in a system configuration. The amplifier properties, including identification data and specification sheet data that were assembled in step 44 may be included in this class.

Amplifier Model Lot 202 is a grouping or collection of amplifiers in a System Configuration.

Performance 203 is a measure of the System Configuration 118 capabilities relative to the performance objective criteria that were set for the sound system.

Penalties 204 is used in evaluating potential system configurations. Penalties may be assigned to specific shortcomings, and may be used to accomplish the weightings in Acoustic Objective Function 139 and System Objective Function 124.

Amplifier Channel 205 contains Loudspeaker 211 and Loudspeaker Model Lot 212 and is contained by Amplifier 201. Amplifier Channel 205 is typically one of the channels in a multichannel amplifier.

Loudspeaker Configuration 119 is contained by System Configuration 118 and contains Loudspeaker Model Lot 212 and Acoustic Measure Record 213.

Loudspeaker 211 is a specific loudspeaker. Loudspeakers may be specified as model numbers, and typically have specified capabilities and characteristics (voltage and wattage ratings and the like). The amplifier properties, including identification data and specification sheet data that were assembled in step 44 may be included in this class.

Loudspeaker Model Lot 212 is a grouping or collection of loudspeakers.

Acoustic Measure Record 213 is contained by Loudspeaker Configuration 119 and contains Measures 214 and Penalties 215.

Measures 214 is a measure of how well the capabilities of the Loudspeaker Configuration 119 relative to the performance criteria that was set for the sound system.

Penalties 215, similar to Penalties 204, is used in evaluating potential loudspeaker configurations. Penalties may be assigned to specific shortcomings, and may be used to accomplish the weightings in Acoustic Objective Function 139 and System Objective Function 124.

A software program for implementing the software architecture of FIGS. 5*a* and 5*b* is included as Supplementary Disk A. The program is designed to run on the Windows 2000 operating system, running on a standard laptop personal computer.

Figure 6:
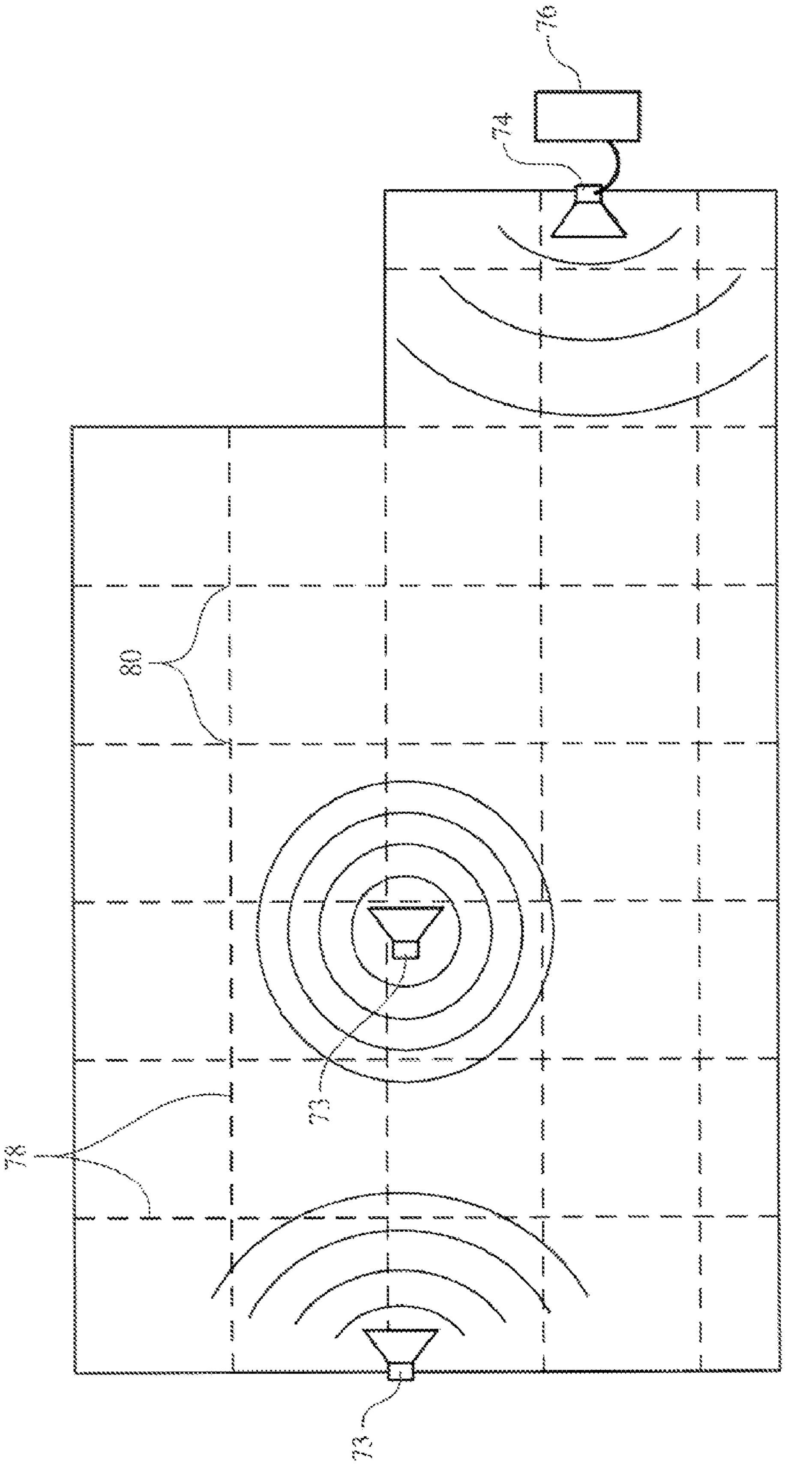
FIG. 6 is a diagrammatic view of floor layout useful in explaining aspects of the invention.

Referring now to FIG. 6, there is shown a hypothetical listening area 70 for the purpose of explaining Point Listener 138 and Receiver Region 137. Sound for listening area 70 is provided by loudspeakers 72, 73, and 74, which receive an audio signal from amplifier 76. Mathematically, the listening area is overlaid with a grid 78. The intersections 80 of the grid lines represent points correspond to the points associated with Point Listener class 138. The direct field radiation from loudspeakers 72, 73 and 74 at each intersection 80 is determined. Data from the several points are combined to obtain a receiver region, which corresponds to Receiver Region class 137. If polar plots for the loudspeakers 72, 73, and 74 are available, the polar plot is taken into account when determining the direct field radiation. In other embodiments of the invention, more complex techniques, such as including reverberant field radiation, for determining a sound field could be used. These techniques may give somewhat more precise estimations of the sound field using more computational power.

Figure 7:
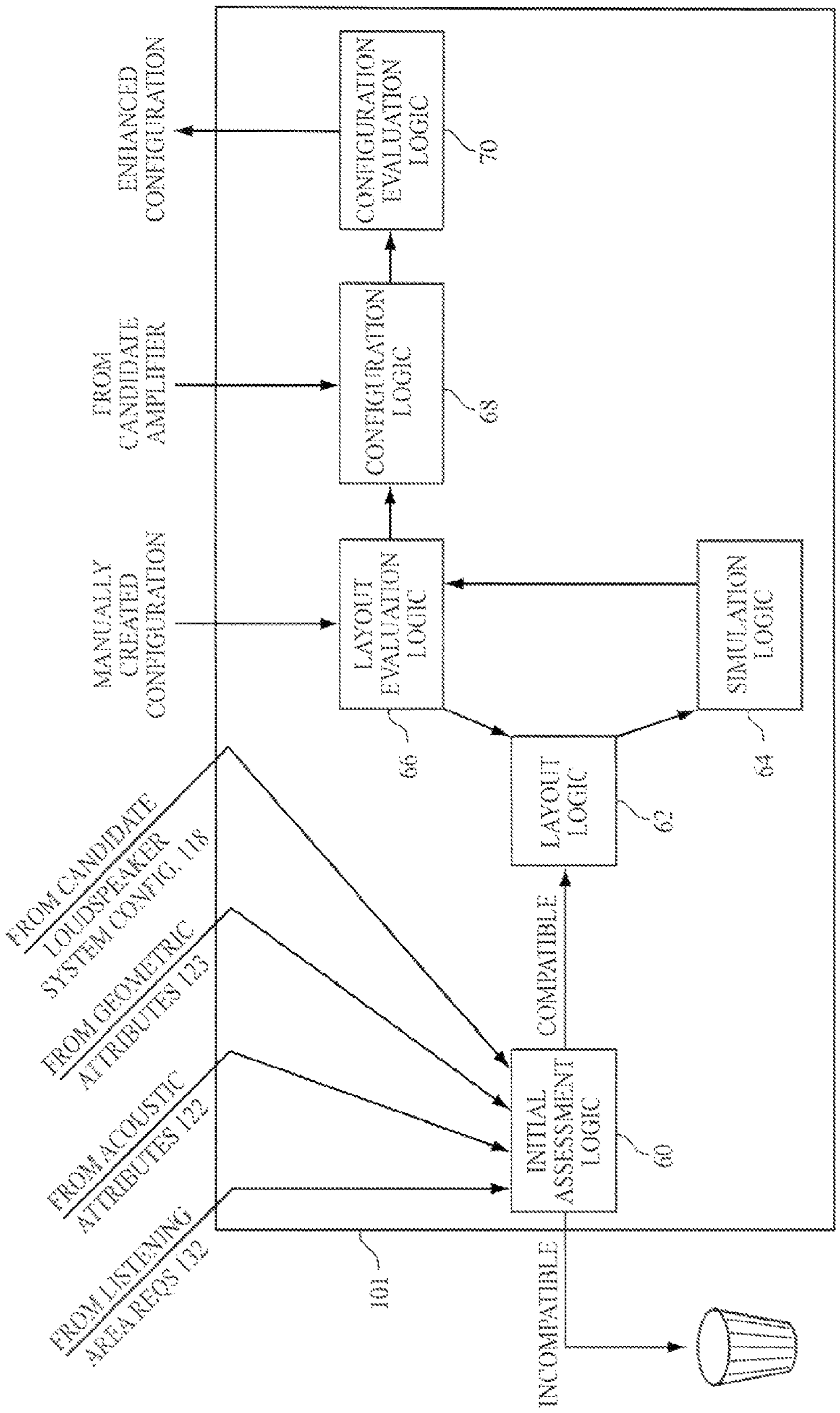
FIG. 7 is a block diagram illustrating the logical arrangement of the enhancer.

Referring now to FIG. 7, there is shown a logical diagram of Enhancer 101. Initial assessment logic 60 receives from Listening Area Preferences 132 the sound system preferences, from Acoustic Attributes 122 the acoustic features, from Geometric Attributes 123 the geometric features, and from Candidate Loudspeaker Systems 125 a number of candidate loudspeaker systems for initial assessment. If the total number of potential candidate loudspeaker systems is small, all potential candidate systems may be submitted to initial assessment logic 60. If the total number of potential candidate loudspeaker systems is large, a subset of the total number of potential candidate loudspeaker systems may be selected based on predetermined rules. Initial assessment logic 60 performs a rules-base first assessment of the candidate system vis-à-vis the preferences and attributes, discards the incompatible systems, and forwards the compatible candidate configurations to layout logic 62. Layout logic 62 develops a layout (according to rules) for each of the compatible candidate configurations, and forwards the layout to simulation logic 64. Simulation logic 64 simulates the layout (using Receiver Region 137) of the compatible candidate configurations and forwards the simulation results (that is, the results of the process described above in the discussion of FIG. 6) to Evaluation Logic 66. The layout may be modified and cycled through layout logic 62, simulation logic 64, and layout evaluation logic 66 until the layout for each candidate layout is enhanced. The enhanced layout for each candidate is then forwarded to configuration logic 68, which combines the enhanced layouts with candidate amplifiers from Candidate Amplifier 115 that are suitable to power the loudspeaker configuration. In the event that there is more than one candidate amplifier, the system evaluator logic 70 selects a preferred enhanced system configuration. Preference may be done based on a number of factors, but typically the preferred configuration is the lowest priced configuration that meets the desired performance criteria. Rules that are used in initial assessments, selection of candidate loudspeaker systems, and layout logic may be rules that are stated in published guides to sound system design, or may be rules that have been devised by the system designer.

The enhancer may assemble the data for the BOM, layout, and wiring diagram. The BOM, layout, and wiring diagram can be displayed as in FIGS. 4*a* and 4*b* , using conventional graphical display techniques.

Another operation of the configuration Enhancer 101 is the evaluation of manually created configuration. A manually determined configuration is simulated by simulation logic 64 and evaluated by the evaluation logic 66 and determined to either meet or not meet requirements.

It is evident that those skilled in the art may now make numerous uses of and departures from the specific apparatus and techniques disclosed herein without departing from the inventive concepts. Consequently, the invention is to be construed as embracing each and every novel feature and novel combination of features present in or possessed by the apparatus and techniques disclosed herein and limited only by the spirit and scope of the appended claims.

What is claimed is:

1. A non-transitory computer-readable medium bearing instructions to cause a computer to:

receive acoustic data representing acoustic characteristics of a facility for which a sound system is being designed, component property data representing properties of components of the sound system, and performance data representing desired performance capabilities of the sound system, and generate in real time, based on the acoustic data, the component property data, and the performance data, a configuration of a sound system having the desired capabilities, the configuration comprising identification of components and interconnections between said components.

2. The medium of claim 1 also including providing a display illustrating the components and interconnections.

3. The medium of claim 1 in which the instructions are also to cause the computer to interact with a microphone and a frequency response measuring device to equalize said sound system.

4. The medium of claim 1 in which the acoustic data that is received represents acoustic characteristics of acoustic spaces in the facility.

5. The medium of claim 1 in which the component property data that is received represents sound equipment component capabilities.

6. The medium of claim 1 in which the configuration that is generated comprises a bill of materials for the sound system.

7. The medium of claim 1 in which the configuration that is generated comprises a block diagram for the sound system.

8. The medium of claim 1 in which the configuration that is generated comprises a layout for the sound system.

9. The medium of claim 1 in which the instructions are to cause the computer to receive data and generate a configuration for a second system, and to evaluate the sound system and the second sound system according to predetermined criteria.

10. The medium of claim 9 in which the predetermined criteria include factors that are weighted.

11. A non-transitory computer-readable medium bearing instructions to cause a computer to:

receive acoustic data representing acoustic characteristics of acoustic spaces of a facility for which a sound system is being designed, component property data representing properties of sound equipment components of the sound system, and performance data representing desired performance capabilities of the sound system, generate in real time, based on the acoustic data, the component property data, and the performance data, a configuration of a sound system having the desired capabilities, the configuration comprising identification of components and interconnections between said components, the configuration including a bill of materials, a block diagram, and a layout of the sound system, interact with a microphone and a frequency response measuring device to equalize said sound system, receive data and generate a configuration for a second sound system, and evaluate the sound system and the second sound system according to predetermined, weighted criteria.

* * * * *